(12) United States Patent
Langhammer

(10) Patent No.: US 8,706,790 B1
(45) Date of Patent: Apr. 22, 2014

(54) IMPLEMENTING MIXED-PRECISION FLOATING-POINT OPERATIONS IN A PROGRAMMABLE INTEGRATED CIRCUIT DEVICE

(75) Inventor: Martin Langhammer, Salisbury (GB)

(73) Assignee: Altera Corporation, San Jose, CA (US)

( * ) Notice: Subject to any disclaimer, the term of this patent is extended or adjusted under 35 U.S.C. 154(b) by 980 days.

(21) Appl. No.: 12/396,720

(22) Filed: Mar. 3, 2009

(51) Int. Cl.
  *G06F 7/38* (2006.01)
  *G06F 7/44* (2006.01)
  *G06F 7/487* (2006.01)

(52) U.S. Cl.
  CPC ............. *G06F 7/4876* (2013.01); *G06F 7/487* (2013.01)
  USPC ........................... 708/513; 708/495; 708/503

(58) Field of Classification Search
  USPC ................... 708/501, 503, 523, 620–632
  See application file for complete search history.

(56) References Cited

U.S. PATENT DOCUMENTS

| | | | |
|---|---|---|---|
| 3,473,160 A | 10/1969 | Wahlstrom | |
| 3,697,734 A | 10/1972 | Booth et al. | |
| 3,800,130 A | 3/1974 | Martinson et al. | |
| 4,156,927 A | 5/1979 | McElroy et al. | |
| 4,179,746 A | 12/1979 | Tubbs | |
| 4,212,076 A | 7/1980 | Conners | |
| 4,215,406 A | 7/1980 | Gomola et al. | |
| 4,215,407 A | 7/1980 | Gomola et al. | |
| 4,422,155 A | 12/1983 | Amir et al. | |
| 4,484,259 A | 11/1984 | Palmer et al. | |
| 4,521,907 A | 6/1985 | Amir et al. | |
| 4,575,812 A | 3/1986 | Kloker et al. | |
| 4,594,679 A * | 6/1986 | George et al. | 708/503 |
| 4,597,053 A | 6/1986 | Chamberlin | |
| 4,616,330 A | 10/1986 | Betz | |
| 4,623,961 A | 11/1986 | Mackiewicz | |
| 4,682,302 A | 7/1987 | Williams | |
| 4,718,057 A | 1/1988 | Venkitakrishnan et al. | |
| 4,727,508 A | 2/1988 | Williams | |
| 4,736,335 A | 4/1988 | Barban | |
| 4,754,421 A * | 6/1988 | Bosshart | 708/625 |
| 4,791,590 A | 12/1988 | Ku et al. | |
| 4,799,004 A | 1/1989 | Mori | |

(Continued)

FOREIGN PATENT DOCUMENTS

| | | |
|---|---|---|
| EP | 0 158 430 | 10/1985 |
| EP | 0 380 456 | 8/1990 |

(Continued)

OTHER PUBLICATIONS

H. Thapliyal, H.R. Arabnia, A.P.Vinod, "Combined integer and floating point multiplication architecture(CIFM) for FPGAs and its reversible logic implementation", Proceedings MWSCAS 2006, Puerto Rico, Aug. 2006.*

(Continued)

*Primary Examiner* — Chuong D Ngo
*Assistant Examiner* — Matthew Sandifer
(74) *Attorney, Agent, or Firm* — Ropes & Gray LLP; Jeffrey H. Ingerman

(57) ABSTRACT

The resources needed—particularly in a programmable device—when carrying out a mixed-precision multiplication-based floating-point operation (i.e., multiplication or division) is reduced by maintaining the mantissas of the operands in their native precisions instead of promoting the lower-precision number to the higher precision. Exponents and other elements can be handled by the higher-precision logic as they do not consume significant resources.

18 Claims, 5 Drawing Sheets

(56) References Cited

U.S. PATENT DOCUMENTS

| | | | |
|---|---|---|---|
| 4,823,260 A * | 4/1989 | Imel et al. ..................... 712/222 |
| 4,823,295 A | 4/1989 | Mader |
| 4,839,847 A | 6/1989 | Laprade |
| 4,871,930 A | 10/1989 | Wong et al. |
| 4,893,268 A * | 1/1990 | Denman et al. ............... 708/627 |
| 4,908,788 A | 3/1990 | Fujiyama |
| 4,912,345 A | 3/1990 | Steele et al. |
| 4,918,637 A | 4/1990 | Morton |
| 4,967,160 A | 10/1990 | Quievy et al. |
| 4,982,354 A | 1/1991 | Takeuchi et al. |
| 4,991,010 A | 2/1991 | Hailey et al. |
| 4,994,997 A | 2/1991 | Martin et al. |
| 4,999,803 A | 3/1991 | Turrini et al. |
| 5,073,863 A | 12/1991 | Zhang |
| 5,081,604 A | 1/1992 | Tanaka |
| 5,122,685 A | 6/1992 | Chan et al. |
| 5,128,559 A | 7/1992 | Steele |
| 5,175,702 A | 12/1992 | Beraud et al. |
| 5,208,491 A | 5/1993 | Ebeling et al. |
| RE34,363 E | 8/1993 | Freeman |
| 5,267,187 A | 11/1993 | Hsieh et al. |
| 5,296,759 A | 3/1994 | Sutherland et al. |
| 5,338,983 A | 8/1994 | Agarwala |
| 5,339,263 A | 8/1994 | White |
| 5,349,250 A | 9/1994 | New |
| 5,357,152 A | 10/1994 | Jennings, III et al. |
| 5,371,422 A | 12/1994 | Patel et al. |
| 5,373,461 A | 12/1994 | Bearden et al. |
| 5,375,079 A | 12/1994 | Uramoto et al. |
| 5,381,357 A | 1/1995 | Wedgwood et al. |
| 5,404,324 A | 4/1995 | Colon-Bonet |
| 5,424,589 A | 6/1995 | Dobbelaere et al. |
| 5,446,651 A | 8/1995 | Moyse et al. |
| 5,451,948 A | 9/1995 | Jekel |
| 5,452,231 A | 9/1995 | Butts et al. |
| 5,452,375 A | 9/1995 | Rousseau et al. |
| 5,457,644 A | 10/1995 | McCollum |
| 5,465,226 A | 11/1995 | Goto |
| 5,465,375 A | 11/1995 | Thepaut et al. |
| 5,481,686 A * | 1/1996 | Dockser ........................ 712/222 |
| 5,483,178 A | 1/1996 | Costello et al. |
| 5,497,498 A | 3/1996 | Taylor |
| 5,500,812 A | 3/1996 | Saishi et al. |
| 5,500,828 A | 3/1996 | Doddington et al. |
| 5,523,963 A | 6/1996 | Hsieh et al. |
| 5,528,550 A | 6/1996 | Pawate et al. |
| 5,537,601 A | 7/1996 | Kimura et al. |
| 5,541,864 A | 7/1996 | Van Bavel et al. |
| 5,546,018 A | 8/1996 | New et al. |
| 5,550,993 A | 8/1996 | Ehlig et al. |
| 5,559,450 A | 9/1996 | Ngai et al. |
| 5,563,526 A | 10/1996 | Hastings et al. |
| 5,563,819 A | 10/1996 | Nelson |
| 5,570,039 A | 10/1996 | Oswald et al. |
| 5,570,040 A | 10/1996 | Lytle et al. |
| 5,572,148 A | 11/1996 | Lytle et al. |
| 5,581,501 A | 12/1996 | Sansbury et al. |
| 5,590,350 A | 12/1996 | Guttag et al. |
| 5,594,366 A | 1/1997 | Khong et al. |
| 5,594,912 A | 1/1997 | Brueckmann et al. |
| 5,596,763 A | 1/1997 | Guttag et al. |
| 5,606,266 A | 2/1997 | Pedersen |
| 5,617,058 A | 4/1997 | Adrian et al. |
| 5,631,848 A | 5/1997 | Laczko et al. |
| 5,633,601 A | 5/1997 | Nagaraj |
| 5,636,150 A | 6/1997 | Okamoto |
| 5,636,368 A | 6/1997 | Harrison et al. |
| 5,640,578 A | 6/1997 | Balmer et al. |
| 5,644,519 A | 7/1997 | Yatim et al. |
| 5,644,522 A | 7/1997 | Moyse et al. |
| 5,646,545 A | 7/1997 | Trimberger et al. |
| 5,646,875 A | 7/1997 | Taborn et al. |
| 5,648,732 A | 7/1997 | Duncan |
| 5,652,903 A | 7/1997 | Weng et al. |
| 5,655,069 A | 8/1997 | Ogawara et al. |
| 5,664,192 A | 9/1997 | Lloyd et al. |
| 5,689,195 A | 11/1997 | Cliff et al. |
| 5,696,708 A | 12/1997 | Leung |
| 5,729,495 A | 3/1998 | Madurawe |
| 5,740,404 A | 4/1998 | Baji |
| 5,744,980 A | 4/1998 | McGowan et al. |
| 5,744,991 A | 4/1998 | Jefferson et al. |
| 5,754,459 A | 5/1998 | Telikepalli |
| 5,761,483 A | 6/1998 | Trimberger |
| 5,764,555 A | 6/1998 | McPherson et al. |
| 5,768,613 A | 6/1998 | Asghar |
| 5,771,186 A | 6/1998 | Kodali et al. |
| 5,777,912 A | 7/1998 | Leung et al. |
| 5,784,636 A | 7/1998 | Rupp |
| 5,790,446 A | 8/1998 | Yu et al. |
| 5,794,067 A | 8/1998 | Kadowaki |
| 5,801,546 A | 9/1998 | Pierce et al. |
| 5,805,477 A | 9/1998 | Perner |
| 5,805,913 A | 9/1998 | Guttag et al. |
| 5,808,926 A | 9/1998 | Gorshtein et al. |
| 5,812,479 A | 9/1998 | Cliff et al. |
| 5,812,562 A | 9/1998 | Baeg |
| 5,815,422 A | 9/1998 | Dockser |
| 5,821,776 A | 10/1998 | McGowan |
| 5,825,202 A | 10/1998 | Tavana et al. |
| 5,838,165 A | 11/1998 | Chatter |
| 5,841,684 A | 11/1998 | Dockser |
| 5,847,579 A | 12/1998 | Trimberger |
| 5,847,978 A | 12/1998 | Ogura et al. |
| 5,847,981 A | 12/1998 | Kelley et al. |
| 5,859,878 A | 1/1999 | Phillips et al. |
| 5,869,979 A | 2/1999 | Bocchino |
| 5,872,380 A | 2/1999 | Rostoker et al. |
| 5,874,834 A | 2/1999 | New |
| 5,878,250 A | 3/1999 | LeBlanc |
| 5,880,981 A | 3/1999 | Kojima et al. |
| 5,892,962 A | 4/1999 | Cloutier |
| 5,894,228 A | 4/1999 | Reddy et al. |
| 5,898,602 A | 4/1999 | Rothman et al. |
| 5,931,898 A | 8/1999 | Khoury |
| 5,942,914 A | 8/1999 | Reddy et al. |
| 5,944,774 A | 8/1999 | Dent |
| 5,949,710 A | 9/1999 | Pass et al. |
| 5,951,673 A | 9/1999 | Miyata |
| 5,956,265 A | 9/1999 | Lewis |
| 5,959,871 A | 9/1999 | Pierzchala et al. |
| 5,960,193 A | 9/1999 | Guttag et al. |
| 5,961,635 A | 10/1999 | Guttag et al. |
| 5,963,048 A | 10/1999 | Harrison et al. |
| 5,963,050 A | 10/1999 | Young et al. |
| 5,968,196 A | 10/1999 | Ramamurthy et al. |
| 5,970,254 A | 10/1999 | Cooke et al. |
| 5,978,260 A | 11/1999 | Trimberger et al. |
| 5,982,195 A | 11/1999 | Cliff et al. |
| 5,986,465 A | 11/1999 | Mendel |
| 5,991,788 A | 11/1999 | Mintzer |
| 5,991,898 A | 11/1999 | Rajski et al. |
| 5,995,748 A | 11/1999 | Guttag et al. |
| 5,999,015 A | 12/1999 | Cliff et al. |
| 5,999,990 A | 12/1999 | Sharrit et al. |
| 6,005,806 A | 12/1999 | Madurawe et al. |
| 6,006,321 A | 12/1999 | Abbott |
| 6,009,451 A | 12/1999 | Burns |
| 6,018,755 A | 1/2000 | Gonikberg et al. |
| 6,020,759 A | 2/2000 | Heile |
| 6,021,423 A | 2/2000 | Nag et al. |
| 6,029,187 A | 2/2000 | Verbauwhede |
| 6,031,763 A | 2/2000 | Sansbury |
| 6,041,339 A | 3/2000 | Yu et al. |
| 6,041,340 A | 3/2000 | Mintzer |
| 6,052,327 A | 4/2000 | Reddy et al. |
| 6,052,755 A | 4/2000 | Terrill et al. |
| 6,052,773 A | 4/2000 | DeHon et al. |
| 6,055,555 A | 4/2000 | Boswell et al. |
| 6,064,614 A | 5/2000 | Khoury |
| 6,065,131 A | 5/2000 | Andrews et al. |
| 6,066,960 A | 5/2000 | Pedersen |
| 6,069,487 A | 5/2000 | Lane et al. |
| 6,072,994 A | 6/2000 | Phillips et al. |

(56) References Cited

U.S. PATENT DOCUMENTS

| | | | |
|---|---|---|---|
| 6,073,154 A | 6/2000 | Dick | |
| 6,075,381 A | 6/2000 | LaBerge | |
| 6,084,429 A | 7/2000 | Trimberger | |
| 6,085,317 A | 7/2000 | Smith | |
| 6,091,261 A | 7/2000 | DeLange | |
| 6,091,765 A | 7/2000 | Pietzold, III et al. | |
| 6,094,726 A | 7/2000 | Gonion et al. | |
| 6,097,988 A | 8/2000 | Tobias | |
| 6,098,163 A | 8/2000 | Guttag et al. | |
| 6,107,820 A | 8/2000 | Jefferson et al. | |
| 6,107,821 A | 8/2000 | Kelem et al. | |
| 6,107,824 A | 8/2000 | Reddy et al. | |
| 6,108,772 A * | 8/2000 | Sharangpani | 712/221 |
| 6,130,554 A | 10/2000 | Kolze et al. | |
| 6,140,839 A | 10/2000 | Kaviani et al. | |
| 6,144,980 A | 11/2000 | Oberman | |
| 6,154,049 A | 11/2000 | New | |
| 6,157,210 A | 12/2000 | Zaveri et al. | |
| 6,163,788 A | 12/2000 | Chen et al. | |
| 6,167,415 A | 12/2000 | Fischer et al. | |
| 6,175,849 B1 | 1/2001 | Smith | |
| 6,215,326 B1 | 4/2001 | Jefferson et al. | |
| 6,226,735 B1 | 5/2001 | Mirsky | |
| 6,242,947 B1 | 6/2001 | Trimberger | |
| 6,243,729 B1 | 6/2001 | Staszewski | |
| 6,246,258 B1 | 6/2001 | Lesea | |
| 6,260,053 B1 | 7/2001 | Maulik et al. | |
| 6,279,021 B1 | 8/2001 | Takano et al. | |
| 6,286,024 B1 | 9/2001 | Yano et al. | |
| 6,314,442 B1 | 11/2001 | Suzuki | |
| 6,314,551 B1 | 11/2001 | Borland | |
| 6,321,246 B1 | 11/2001 | Page et al. | |
| 6,323,680 B1 | 11/2001 | Pedersen et al. | |
| 6,327,605 B2 | 12/2001 | Arakawa et al. | |
| 6,346,824 B1 | 2/2002 | New | |
| 6,351,142 B1 | 2/2002 | Abbott | |
| 6,353,843 B1 | 3/2002 | Chehrazi et al. | |
| 6,359,468 B1 | 3/2002 | Park et al. | |
| 6,360,240 B1 | 3/2002 | Takano et al. | |
| 6,362,650 B1 | 3/2002 | New et al. | |
| 6,366,944 B1 | 4/2002 | Hossain et al. | |
| 6,367,003 B1 | 4/2002 | Davis | |
| 6,369,610 B1 | 4/2002 | Cheung et al. | |
| 6,377,970 B1 | 4/2002 | Abdallah et al. | |
| 6,407,576 B1 | 6/2002 | Ngai et al. | |
| 6,407,694 B1 | 6/2002 | Cox et al. | |
| 6,427,157 B1 | 7/2002 | Webb | |
| 6,434,587 B1 | 8/2002 | Liao et al. | |
| 6,438,569 B1 | 8/2002 | Abbott | |
| 6,438,570 B1 | 8/2002 | Miller | |
| 6,446,107 B1 | 9/2002 | Knowles | |
| 6,453,382 B1 | 9/2002 | Heile | |
| 6,467,017 B1 | 10/2002 | Ngai et al. | |
| 6,480,980 B2 | 11/2002 | Koe | |
| 6,483,343 B1 | 11/2002 | Faith et al. | |
| 6,487,575 B1 | 11/2002 | Oberman | |
| 6,523,055 B1 | 2/2003 | Yu et al. | |
| 6,523,057 B1 | 2/2003 | Savo et al. | |
| 6,531,888 B2 | 3/2003 | Abbott | |
| 6,538,470 B1 | 3/2003 | Langhammer et al. | |
| 6,542,000 B1 | 4/2003 | Black et al. | |
| 6,556,044 B2 | 4/2003 | Langhammer et al. | |
| 6,557,092 B1 | 4/2003 | Callen | |
| 6,571,268 B1 | 5/2003 | Giacalone et al. | |
| 6,573,749 B2 | 6/2003 | New et al. | |
| 6,574,762 B1 | 6/2003 | Karimi et al. | |
| 6,578,060 B2 | 6/2003 | Chen et al. | |
| 6,591,283 B1 | 7/2003 | Conway et al. | |
| 6,591,357 B2 | 7/2003 | Mirsky | |
| 6,600,495 B1 | 7/2003 | Boland et al. | |
| 6,600,788 B1 | 7/2003 | Dick et al. | |
| 6,628,140 B2 | 9/2003 | Langhammer et al. | |
| 6,687,722 B1 | 2/2004 | Larsson et al. | |
| 6,692,534 B1 | 2/2004 | Wang et al. | |
| 6,700,581 B2 | 3/2004 | Baldwin et al. | |
| 6,725,441 B1 | 4/2004 | Keller et al. | |
| 6,728,901 B1 | 4/2004 | Rajski et al. | |
| 6,731,133 B1 | 5/2004 | Feng et al. | |
| 6,732,134 B1 | 5/2004 | Rosenberg | |
| 6,744,278 B1 | 6/2004 | Liu et al. | |
| 6,745,254 B2 | 6/2004 | Boggs et al. | |
| 6,763,367 B2 | 7/2004 | Kwon et al. | |
| 6,771,094 B1 | 8/2004 | Langhammer et al. | |
| 6,774,669 B1 | 8/2004 | Liu et al. | |
| 6,781,408 B1 | 8/2004 | Langhammer | |
| 6,781,410 B2 | 8/2004 | Pani et al. | |
| 6,788,104 B2 | 9/2004 | Singh et al. | |
| 6,801,924 B1 | 10/2004 | Green et al. | |
| 6,836,839 B2 | 12/2004 | Master et al. | |
| 6,874,079 B2 | 3/2005 | Hogenauer | |
| 6,889,238 B2 | 5/2005 | Johnson | |
| 6,904,471 B2 | 6/2005 | Boggs et al. | |
| 6,915,322 B2 * | 7/2005 | Hong | 708/625 |
| 6,924,663 B2 | 8/2005 | Masui et al. | |
| 6,963,890 B2 | 11/2005 | Dutta et al. | |
| 6,971,083 B1 | 11/2005 | Farrugia et al. | |
| 6,978,287 B1 | 12/2005 | Langhammer | |
| 6,983,300 B2 | 1/2006 | Ferroussat | |
| 7,020,673 B2 | 3/2006 | Ozawa | |
| 7,024,446 B2 | 4/2006 | Langhammer et al. | |
| 7,047,272 B2 | 5/2006 | Giacalone et al. | |
| 7,062,526 B1 | 6/2006 | Hoyle | |
| 7,093,204 B2 | 8/2006 | Oktem et al. | |
| 7,107,305 B2 | 9/2006 | Deng et al. | |
| 7,113,969 B1 | 9/2006 | Green et al. | |
| 7,181,484 B2 | 2/2007 | Stribaek et al. | |
| 7,230,451 B1 * | 6/2007 | Langhammer | 326/41 |
| 7,313,585 B2 | 12/2007 | Winterrowd | |
| 7,343,388 B1 | 3/2008 | Burney et al. | |
| 7,395,298 B2 | 7/2008 | Debes et al. | |
| 7,401,109 B2 | 7/2008 | Koc et al. | |
| 7,409,417 B2 | 8/2008 | Lou | |
| 7,415,542 B2 | 8/2008 | Hennedy et al. | |
| 7,421,465 B1 | 9/2008 | Rarick et al. | |
| 7,428,565 B2 | 9/2008 | Fujimori | |
| 7,428,566 B2 | 9/2008 | Siu et al. | |
| 7,430,578 B2 | 9/2008 | Debes et al. | |
| 7,430,656 B2 | 9/2008 | Sperber et al. | |
| 7,447,310 B2 | 11/2008 | Koc et al. | |
| 7,472,155 B2 | 12/2008 | Simkins et al. | |
| 7,508,936 B2 | 3/2009 | Eberle et al. | |
| 7,536,430 B2 | 5/2009 | Guevokian et al. | |
| 7,567,997 B2 | 7/2009 | Simkins et al. | |
| 7,590,676 B1 | 9/2009 | Langhammer | |
| 7,646,430 B2 | 1/2010 | Brown Elliott et al. | |
| 7,650,374 B1 * | 1/2010 | Gura et al. | 708/620 |
| 7,668,896 B2 | 2/2010 | Lutz et al. | |
| 7,719,446 B2 | 5/2010 | Rosenthal et al. | |
| 7,720,898 B2 | 5/2010 | Driker et al. | |
| 7,769,797 B2 | 8/2010 | Cho et al. | |
| 7,814,136 B1 | 10/2010 | Verma et al. | |
| 7,814,137 B1 | 10/2010 | Mauer | |
| 7,822,799 B1 | 10/2010 | Langhammer et al. | |
| 7,836,117 B1 | 11/2010 | Langhammer et al. | |
| 7,865,541 B1 | 1/2011 | Langhammer | |
| 7,917,567 B1 | 3/2011 | Mason et al. | |
| 7,930,335 B2 | 4/2011 | Gura | |
| 7,930,336 B2 | 4/2011 | Langhammer | |
| 7,949,699 B1 | 5/2011 | Neoh et al. | |
| 8,024,394 B2 * | 9/2011 | Prokopenko et al. | 708/513 |
| 8,037,119 B1 * | 10/2011 | Oberman et al. | 708/503 |
| 8,041,759 B1 | 10/2011 | Langhammer et al. | |
| 8,090,758 B1 | 1/2012 | Shimanek et al. | |
| 8,112,466 B2 | 2/2012 | Minz et al. | |
| 8,495,121 B2 * | 7/2013 | Oliver et al. | 708/501 |
| 2001/0023425 A1 | 9/2001 | Oberman et al. | |
| 2001/0029515 A1 | 10/2001 | Mirsky | |
| 2001/0037352 A1 | 11/2001 | Hong | |
| 2002/0002573 A1 | 1/2002 | Landers et al. | |
| 2002/0032713 A1 * | 3/2002 | Jou et al. | 708/625 |
| 2002/0038324 A1 | 3/2002 | Page et al. | |
| 2002/0049798 A1 | 4/2002 | Wang et al. | |
| 2002/0078114 A1 | 6/2002 | Wang et al. | |
| 2002/0089348 A1 | 7/2002 | Langhammer | |

(56) References Cited

U.S. PATENT DOCUMENTS

| | | | |
|---|---|---|---|
| 2002/0116434 A1 | 8/2002 | Nancekievill | |
| 2003/0065699 A1* | 4/2003 | Burns | 708/625 |
| 2003/0088757 A1 | 5/2003 | Lindner et al. | |
| 2004/0064770 A1 | 4/2004 | Xin | |
| 2004/0083412 A1 | 4/2004 | Corbin et al. | |
| 2004/0103133 A1 | 5/2004 | Gurney | |
| 2004/0122882 A1 | 6/2004 | Zakharov et al. | |
| 2004/0148321 A1 | 7/2004 | Guevorkian et al. | |
| 2004/0172439 A1 | 9/2004 | Lin | |
| 2004/0178818 A1 | 9/2004 | Crotty et al. | |
| 2004/0193981 A1 | 9/2004 | Clark et al. | |
| 2004/0267857 A1 | 12/2004 | Abel et al. | |
| 2004/0267863 A1 | 12/2004 | Bhushan et al. | |
| 2005/0038842 A1 | 2/2005 | Stoye | |
| 2005/0144212 A1 | 6/2005 | Simkins et al. | |
| 2005/0144215 A1 | 6/2005 | Simkins et al. | |
| 2005/0144216 A1 | 6/2005 | Simkins et al. | |
| 2005/0166038 A1 | 7/2005 | Wang et al. | |
| 2005/0187997 A1 | 8/2005 | Zheng et al. | |
| 2005/0187999 A1 | 8/2005 | Zheng et al. | |
| 2005/0262175 A1 | 11/2005 | Iino et al. | |
| 2006/0020655 A1 | 1/2006 | Lin | |
| 2006/0112160 A1* | 5/2006 | Ishii et al. | 708/495 |
| 2007/0083585 A1 | 4/2007 | St. Denis et al. | |
| 2007/0185951 A1 | 8/2007 | Lee et al. | |
| 2007/0185952 A1 | 8/2007 | Langhammer et al. | |
| 2007/0241773 A1 | 10/2007 | Hutchings et al. | |
| 2008/0133627 A1 | 6/2008 | Langhammer et al. | |
| 2008/0159441 A1* | 7/2008 | Liao et al. | 375/324 |
| 2008/0183783 A1 | 7/2008 | Tubbs | |
| 2009/0083358 A1* | 3/2009 | Allen | 708/495 |
| 2009/0113186 A1* | 4/2009 | Kato et al. | 712/222 |
| 2009/0172052 A1 | 7/2009 | DeLaquil et al. | |
| 2009/0182795 A1 | 7/2009 | Dobbek et al. | |
| 2009/0187615 A1 | 7/2009 | Abe et al. | |
| 2009/0228689 A1 | 9/2009 | Muff et al. | |
| 2009/0292750 A1 | 11/2009 | Reyzin et al. | |
| 2009/0300088 A1 | 12/2009 | Michaels et al. | |
| 2010/0098189 A1 | 4/2010 | Oketani | |
| 2010/0146022 A1 | 6/2010 | Swartzlander et al. | |
| 2010/0191939 A1 | 7/2010 | Muff et al. | |
| 2011/0219052 A1 | 9/2011 | Langhammer | |
| 2011/0238720 A1 | 9/2011 | Langhammer | |
| 2012/0166512 A1* | 6/2012 | Wong et al. | 708/650 |

FOREIGN PATENT DOCUMENTS

| | | |
|---|---|---|
| EP | 0 411 491 | 2/1991 |
| EP | 0 419 105 | 3/1991 |
| EP | 0 461 798 | 12/1991 |
| EP | 0 498 066 | 8/1992 |
| EP | 0 555 092 | 8/1993 |
| EP | 0 606 653 | 7/1994 |
| EP | 0 657 803 | 6/1995 |
| EP | 0 660 227 | 6/1995 |
| EP | 0 668 659 | 8/1995 |
| EP | 0 721 159 | 7/1996 |
| EP | 0 905 906 | 3/1999 |
| EP | 0 909 028 | 4/1999 |
| EP | 0 927 393 | 7/1999 |
| EP | 0 992 885 | 4/2000 |
| EP | 1 031 934 | 8/2000 |
| EP | 1 058 185 | 12/2000 |
| EP | 1 220 108 | 7/2002 |
| GB | 2 283 602 | 5/1995 |
| GB | 2 286 737 | 8/1995 |
| GB | 2 318 198 | 4/1998 |
| JP | 61-237133 | 10/1986 |
| JP | 63-216131 | 8/1988 |
| JP | 4-332036 | 11/1992 |
| JP | 5-134851 | 6/1993 |
| JP | 06-187129 | 7/1994 |
| JP | 7-135447 | 5/1995 |
| JP | 11-296345 | 10/1999 |
| JP | 2000-259394 | 9/2000 |
| JP | 2002-108606 | 4/2002 |
| JP | 2002-251281 | 9/2002 |
| WO | WO95-27243 | 10/1995 |
| WO | WO96-28774 | 9/1996 |
| WO | WO97-08606 | 3/1997 |
| WO | WO98-12629 | 3/1998 |
| WO | WO98-32071 | 7/1998 |
| WO | WO98-38741 | 9/1998 |
| WO | WO99-22292 | 5/1999 |
| WO | WO99-31574 | 6/1999 |
| WO | WO99-56394 | 11/1999 |
| WO | WO00-51239 | 8/2000 |
| WO | WO00-52824 | 9/2000 |
| WO | WO01-13562 | 2/2001 |
| WO | WO2005/066832 | 7/2005 |
| WO | WO2005-101190 | 10/2005 |

OTHER PUBLICATIONS

H. Thapliyal, H.R. Arabnia, R. Bajpai, K. Sharma, "Combined Integer and Variable Precision (CIVP) Floating Point Multiplication Architecture for FPGAs", Proceedings of the 2007 International Conference on Parallel and Distributed Processing Techniques and Applications (PDPTA'07), Las Vegas, U.S.A, Jun. 2007, vol. 1, pp. 449-450.*

Xilinx Inc., "Virtex-5 XtremeDSP Design Considerations," User Guide UG193, v2.6, Oct. 2007.*

P. Karlstrom, A. Ehliar, D. Liu, "High performance, low latency FPGA based floating point adder and multiplier units in a virtex 4," Norchip Conf., 2006, pp. 31-34.*

G. Even and P.-M. Seidel, "A Comparison of Three Rounding Algorithms for IEEE Floating-Point Multiplication," IEEE Trans. Computers, vol. 49, No. 7, pp. 638-650, Jul. 2000.*

L. Huang , L. Shen , K. Dai and Z. Wang, "A New Architecture for Multiple-Precision Floating-Point Multiply-Add Fused Unit Design", Proc. 18th IEEE Symp. Computer Arithmetic, pp. 69-76, 2007.*

A Nadjia, A Mohamed, B Hamid, I Mohamed, M. Khadidja, "Hardware algorithm for variable precision multiplication on FPGA", IEEE/ACS International Conference on Computer Systems and Applications, pp. 845-848, 2009.*

S. Perri, P. Corsonello, M.A. Iachino, M. Lanuzza and G. Cocorullo, "Variable Precision Arithmetic Circuits for FPGA-Based Multimedia Processors," IEEE Trans. Very Large Scale Integration (VLSI) Systems, vol. 12, No. 9, pp. 995-999, Sep. 2004.*

Altera, "Enabling High-Performance DSP Applications with Stratix V Variable-Precision DSP Blocks," White Paper WP-01131-1.1, May 2011.*

Altera Corporation, "Statix II Device Handbook, Chapter 6—DSP Blocks in Stratix II Devices," v1.1, Jul. 2004.

Altera Corporation, "Digital Signal Processing (DSP)," *Stratix Device Handbook*, vol. 2, Chapter 6 and Chapter 7, v1.1 (Sep. 2004).

Altera Corporation, "DSP Blocks in Stratix II and Stratix II GX Devices " *Stratix II Device Handbook*, vol. 2, Chapter 6, v4.0 (Oct. 2005).

Altera Corporation, "FIR Compiler: MegaCore® Function User Guide," version 3.3.0, rev. 1, pp. 3 11 through 3 15 (Oct. 2005).

Amos, D., "PLD architectures match DSP algorithms " *Electronic Product Design*, vol. 17, No. 7, Jul. 1996, pp. 30, 32.

Analog Devices, Inc., The Applications Engineering Staff of Analog Devices, DSP Division, *Digital Signal Processing Applications Using the ADSP-2100 Family* (edited by Amy Mar), 1990, pp. 141-192).

Andrejas, J., et al., "Reusable DSP functions in FPGAs," *Field-Programmable Logic and Applications. Roadmap to Reconfigurable Computing. 10th International Conference, FPL 2000. Proceedings (Lecture Notes in Computer Science* vol. 1896), Aug. 27-30, 2000, pp. 456-461.

Aoki, T., "Signed-weight arithmetic and its application to a field-programmable digital filter architecture," *IEICE Transactions on Electronics*, 1999 , vol. E82C, No. 9, Sep. 1999, pp. 1687-1698.

(56) References Cited

OTHER PUBLICATIONS

Ashour, M.A., et al., "An FPGA implementation guide for some different types of serial-parallel multiplier-structures," *Microelectronics Journal*, vol. 31, No. 3, 2000, pp. 161-168.
Berg, B.L., et al."Designing Power and Area Efficient Multistage FIR Decimators with Economical Low Order Filters," *ChipCenter Technical Note*, Dec. 2001.
Bursky, D., "Programmable Logic Challenges Traditional ASIC SoC Designs", *Electronic Design*, Apr. 15, 2002.
Chhabra, A. et al., Texas Instruments Inc., "A Block Floating Point Implementation on the TMS320C54x DSP", Application Report SPRA610, Dec. 1999, pp. 1-10.
Colet, P., "When DSPs and FPGAs meet: Optimizing image processing architectures," *Advanced Imaging*, vol. 12, No. 9, Sep. 1997, pp. 14, 16, 18.
Crookes, D., et al., "Design and implementation of a high level programming environment for FPGA-based image processing," *IEE Proceedings-Vision, Image and Signal Processing*, vol. 147, No. 4, Aug. 2000, pp. 377-384.
Debowski, L., et al., "A new flexible architecture of digital control systems based on DSP and complex CPLD technology for power conversion applications," *PCIM 2000: Europe Official Proceedings of the Thirty-Seventh International Intelligent Motion Conference*, Jun. 6-8, 2000, pp. 281-286.
Dick, C., et al., "Configurable logic for digital communications: some signal processing perspectives," *IEEE Communications Magazine*, vol. 37, No. 8, Aug. 1999, pp. 107-111.
Do, T.-T., et al., "A flexible implementation of high-performance FIR filters on Xilinx FPGAs," *Field-Programmable Logic and Applications: From FPGAs to Computing Paradigm. 8th International Workshop, FPL '98. Proceedings*, Hartenstein, R.W., et al., eds., Aug. 31-Sep. 3, 1998, pp. 441-445.
Gaffer, A.A., et al., "Floating-Point Bitwidth Analysis via Automatic Differentiation," *IEEE Conference on Field Programmable Technology*, Hong Kong, Dec. 2002.
Govindu, G. et al., "A Library of Parameterizable Floating-Point Cores for FPGAs and Their Application to Scientific Computing," *Proc Int'l Conf. Eng, Reconfigurable Systems and Algorithms (ERSA '05)*, Jun. 2005.
Govindu, G. et al., "Analysis of High-performance Floating-point Arithmetic on FPGAs," *Proceedings of the 18th International Parallel and Distributed Processing Symposium (PDPS'04)*, pp. 149-156, Apr. 2004.
Guccione, S.A.,"Run-time Reconfiguration at Xilinx," *Parallel and distributed processing: 15 IPDPS 2000 workshops*, Rolim, J., ed., May 1-5, 2000, p. 873.
Hauck, S., "The Future of Reconfigurable Systems," *Keynote Address, 5th Canadian Conference on Field Programmable Devices*, Jun. 1998, http:-- www.ee.washington.edu-people-faculty-hauck-publications-ReconfigFuture.PDF.
Haynes, S.D., et al., "Configurable multiplier blocks for embedding in FPGAs," *Electronicas Letters*, vol. 34, No. 7, pp. 638-639 (Apr. 2, 1998).
Heysters, P.M., et al., "Mapping of DSP algorithms on field programmable function arrays," *Field-Programmable Logic and Applications, Roadmap to Reconfigurable Computing, 10th International Conference, FPL 2000, Proceedings (Lecture Notes in Computer Science* vol. 1896) Aug. 27-30, 2000, pp. 400-411.
Huang, J., et al., "Simulated Performance of 1000BASE-T Receiver with Different Analog Front End Designs," *Proceedings of the 35th Asilomar Conference on Signals, Systems, and Computers*, Nov. 4-7, 2001.
Lattice Semiconductor Corp, *ORCA® FPGA Express™ Interface Manual: ispLEVER® Version 3.0*, 2002.
Lucent Technologies, Microelectronics Group,"Implementing and Optimizing Multipliers in ORCA™ FPGAs,", Application Note. AP97-008FGPA, Feb. 1997.
"Implementing Multipliers in FLEX 10K EABs", *Altera*, Mar. 1996.
"Implementing Logic with the Embedded Array in FLEX 10K Devices", *Altera*, May 2001, ver. 2.1.

Jinghua Li, "Design a pocket multi-bit multiplier in FPGA," *1996 2nd International Conference on ASIC Proceedings* (IEEE Cat. No. 96TH8140) Oct. 21-24, 1996, pp. 275-279.
Jones, G., "Field-programmable digital signal conditioning " *Electronic Product Design*, vol. 21, No. 6, Jun. 2000, pp. C36-C38.
Kiefer, R., et al., "Performance comparison of software-FPGA hardware partitions for a DSP application," *14th Australian Microelectronics Conference. Microelectronics: Technology Today for the Future. MICRO '97 Proceedings*, Sep. 28-Oct. 1, 1997, pp. 88-93.
Kim, Y., et al., "Fast GPU Implementation for the Solution of Tridiagonal Matrix Systems," *Journal of Korean Institute of Information Scientists and Engineers*, vol. 32, No. 12, pp. 692-704, Dec. 2005.
Kramberger, I., "DSP acceleration using a reconfigurable FPGA," *ISIE '99, Proceedings of the IEEE International Symposium on Industrial Electronics* (Cat. No.99TGH8465), vol. 3, Jul. 12-16, 1999, pp. 1522-1525.
Langhammer, M., "How to implement DSP in programmable logic " *Elettronica Oggi*, No. 266, Dec. 1998, pp. 113-115.
Langhammer, M., "Implementing a DSP in Programmable Logic," *Online EE Times*, May 1998, http:--www.eetimes.com-editorial-1998-coverstory9805.html.
Lazaravich, B.V., "Function block oriented field programmable logic arrays," *Motorola, Inc. Technical Developments*, vol. 18, Mar. 1993, pp. 10-11.
Lund, D., et al., "A new development system for reconfigurable digital signal processing," *First International Conference on 3G Mobile Communication Technologies* (Conf. Publ. No. 471), Mar. 27-29, 2000, pp. 306-310.
Miller, N.L., et al., "Reconfigurable integrated circuit for high performance computer arithmetic," *Proceedings of the 1998 IEE Colloquium on Evolvable Hardware Systems (Digest)*, No. 233, 1998, pp. 2-1-2-4.
Mintzer, L., "Xilinx FPGA as an FFT processor," *Electronic Engineering*, vol. 69, No. 845, May 1997, pp. 81, 82, 84.
Faura et al., "A Novel Mixed Signal Programmable Device With On-Chip Microprocessor," *Custom Integrated Circuits Conference*, 1997. Proceedings of the IEEE 1997 Santa Clara, CA, USA, May 5, 1997, pp. 103-106.
Nakasato, N., et al., "Acceleration of Hydrosynamical Simulations using a FPGA board" *The Institute of Electronics Information and Communication Technical Report* CPSY2005-47, vol. 105, No. 515, Jan. 17, 2006.
Nozal, L., et al., "A new vision system: programmable logic devices and digital signal processor architecture (PLD+DSP)," *Proceedings IECON '91. 1991 International Conference on Industrial Electronics, Control and Instrumentation* (Cat. No.91CH2976-9), vol. 3, Oct. 28-Nov. 1, 1991, pp. 2014-2018.
Osana, Y., et al., "Hardware-resource Utilization Analysis on an FPGA-Based Biochemical Simulator ReCSiP" *The Institute of Electronics Information and Communication Technical Report* CPSY2005-63, vol. 105, No. 516, Jan. 18, 2006.
Papenfuss, J.R, et al., "Implementation of a real-time, frequency selective, RF channel simulator using a hybrid DSP-FPGA architecture " *RAWCON 2000: 2000 IEEE Radio and Wireless Conference* (Cat. No. 00EX404), Sep. 10-13, 2000, pp. 135-138.
Parhami, B., "Configurable arithmetic arrays with data-driven control," *34th Asilomar Conference on Signals, Systems and Computers*, vol. 1, 2000, pp. 89-93.
"The QuickDSP Design Guide", Quicklogic, Aug. 2001, revision B.
"QuickDSP™ Family Data Sheet", *Quicklogic*, Aug. 7, 2001, revision B.
Rangasayee, K., "Complex PLDs let you produce efficient arithmetic designs," *EDN (European Edition)*, vol. 41, No. 13, Jun. 20, 1996, pp. 109, 110, 112, 114.
Rosado, A., et al., "A high-speed multiplier coprocessor unit based on FPGA," *Journal of Electrical Engineering*, vol. 48, No. 11-12, 1997, pp. 298-302.
Santillan-Q., G.F., et al., "Real-time integer convolution implemented using systolic arrays and a digit-serial architecture in complex programmable logic devices," *Proceedings of the Third International Workshop on Design of Mixed-Mode Integrated Circuits and Applications* (Cat. No. 99EX303), Jul. 26-28,1999, pp. 147-150.

(56) References Cited

OTHER PUBLICATIONS

Texas Instruments Inc., "TMS320C54x DSP Reference Set, vol. 1: CPU and Peripherals", Literature No. SPRU131F, Apr. 1999, pp. 2-1 through 2-16 and 4-1 through 4-29.
Tisserand, A., et al., "An on-line arithmetic based FPGA for low power custom computing," *Field Programmable Logic and Applications, 9th International Workshop, FPL'99, Proceedings (Lecture Notes in Computer Science* vol. 1673), Lysaght, P., et al., eds., Aug. 30-Sep. 1, 1999, pp. 264-273.
Tralka, C., " Symbiosis of DSP and PLD," *Elektronik*, vol. 49, No. 14, Jul. 11, 2000, pp. 84-96.
Underwood, K. "FPGAs vs. CPUs: Trends in Peak Floating-Point Performance," *Proceedings of the 2004 ACM-SIGDA 12th International Symposium on Field Programmable Gate Arrays*, pp. 171-180, Feb. 22-24, 2004.
Valls, J., et al., "A Study About FPGA-Based Digital Filters," *Signal Processing Systems*, 1998, SIPS 98, 1998 IEEE Workshop, Oct. 10, 1998, pp. 192-201.
"Virtex-II 1.5V Field-Programmable Gate Arrays", *Xilinx*, Jan. 25, 2001, module 2 of 4.
"Virtex-II 1.5V Field-Programmable Gate Arrays", *Xilinx*, Apr. 2, 2001, module 1 of 4.
"Virtex-II 1.5V Field-Programmable Gate Arrays", *Xilinx*, Apr. 2, 2001, module 2 of 4.
Vladimirova, T. et al., "Floating-Point Mathematical Co-Processor for a Single-Chip On-Board Computer," *MAPLD'03 Conference*, D5, Sep. 2003.
Walters, A.L., "A Scaleable FIR Filter Implementation Using 32-bit Floating-Point Complex Arithmetic on ,a FPGA Based Custom Computing Platform," Allison L. Walters, Thesis Submitted to the Faculty of Virginia Polytechnic Institute and State University, Jan. 30, 1998.
Weisstein, E.W., "Karatsuba Multiplication " *MathWorld—A Wolfram Web Resource* (Dec. 9, 2007), accessed Dec. 11, 2007 at http:--mathworld.wolfram.com-KaratsubaMultiplication.html.
Wenzel, L., "Field programmable gate arrays (FPGAs) to replace digital signal processor integrated circuits," *Elektronik*, vol. 49, No. 5, Mar. 7, 2000, pp. 78-86.
"Xilinx Unveils New FPGA Architecture to Enable High-Performance, 10 Million System Gate Designs", *Xilinx*, Jun. 22, 2000.
"Xilinx Announces DSP Algorithms, Tools and Features for Virtex-II Architecture", *Xilinx*, Nov. 21, 2000.
Xilinx Inc., "Virtex-II 1.5V Field-Programmable Gate Arrays", Advance Product Specification, DS031-2 (v1.9), Nov. 29, 2001, Module 2 of 4, pp. 1-39.
Xilinx Inc., "Using Embedded Multipliers", Virtex-II Platform FPGA Handbook, UG002 (v1.3), Dec. 3, 2001, pp. 251-257.
Xilinx, Inc., "A 1D Systolic FIR," copyright 1994-2002, downloaded from http:-- www.iro.umontreal.ca-~aboulham-F6221-Xilinx%20A%201D%20systolic%20FIR.htm.
Xilinx, Inc., "The Future of FPGA's," White Paper, available Nov. 14, 2005 for download from http:--www.xilinx.com-prs_rls,5yrwhite.htm.
Xilinx Inc., "XtremeDSP Design Considerations User Guide," v 1.2, Feb. 4, 2005.
Xilinx Inc., "Complex Multiplier v2.0", DS291 Product Specification/Datasheet, Nov. 2004.
Altera Corporation, "Advanced Synthesis Cookbook: A Design Guide for Stratix II, Stratix III and Stratix IV Devices," Document Version 3.0, 112 pgs., May 2008.
deDinechin, F. et al., "Large multipliers with less DSP blocks," retrieved from http://hal-ens-lyon.archives-ouvertes.fr/ens1-00356421/en/, 9 pgs., available online Jan. 2009.
Wajih, E.-H.Y. et al., "Efficient Hardware Architecture of Recursive Karatsuba-Ofman Multiplier," $3^{rd}$ *International Conference on Design and Technology of Integrated Systems in Nanoscale ERA* 6 pgs, Mar. 2008.
Zhou, G. et al., "Efficient and High-Throughput Implementations of AES-GCM on FPGAs," *International Conference on Field-Programmable Technology*, 8 pgs., Dec. 2007.
Martinson, L. et al., "Digital Matched Filtering with Pipelined Floating Point Fast Fourier Transforms (FFT's)," *IEEE Transactions on Acoustics, Speech, and Signal Processing*, vol. ASSP-23, No. 2, pp. 222-234, Apr. 1975.
Altera Corp., "DSP Blocks in Stratix III Devices," *Stratix III Device Handbook*, vol. 1, Chapter 5, pp. 1 42, Mar. 2010.
Xilinx, Inc., "Implementing Barrel Shifters Using Multipliers," p. 1-4, Aug. 17, 2004.
Fujioka, Y., et al., "240MOPS Reconfigurable Parallel VLSI Processor for Robot Control," *Proceedings of the 1992 International Conference on Industrial Electronics, Control, Instrumentation, and Automation: Signal Processing and Systems Control; Intelligent Sensors and Instrumentation*, vol. 3, pp. 1385-1390, Nov. 9-13, 1992.

\* cited by examiner

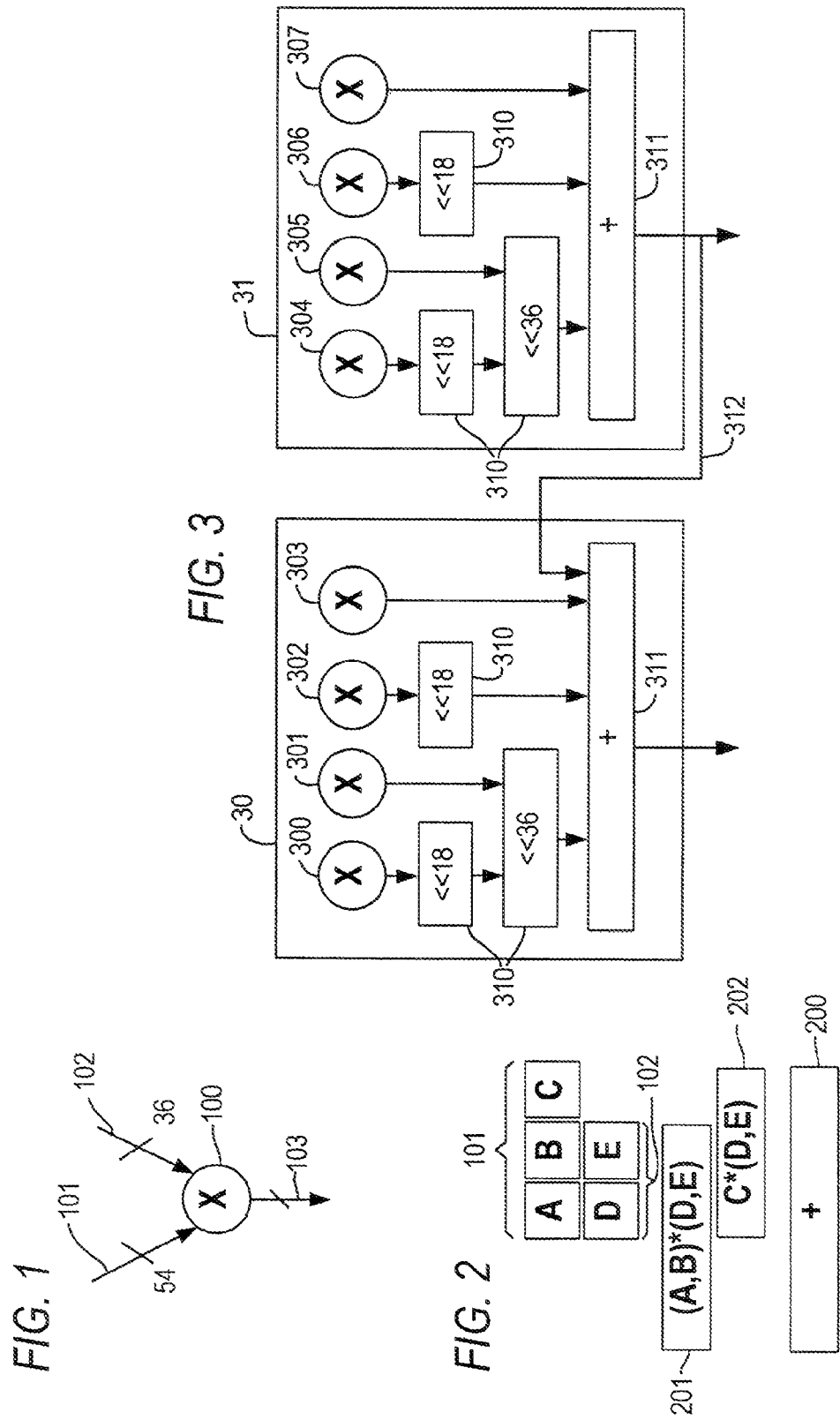

IMPLEMENTING MIXED-PRECISION FLOATING-POINT OPERATIONS IN A PROGRAMMABLE INTEGRATED CIRCUIT DEVICE

BACKGROUND OF THE INVENTION

This invention relates to implementing mixed-precision floating-point operations in programmable integrated circuit devices such as, e.g., programmable logic devices (PLDs).

As applications for which PLDs are used increase in complexity, it has become more common to design PLDs to include specialized processing blocks in addition to blocks of generic programmable logic resources. Such specialized processing blocks may include a concentration of circuitry on a PLD that has been partly or fully hardwired to perform one or more specific tasks, such as a logical or a mathematical operation. A specialized processing block may also contain one or more specialized structures, such as an array of configurable memory elements. Examples of structures that are commonly implemented in such specialized processing blocks include: multipliers, arithmetic logic units (ALUs), barrel-shifters, various memory elements (such as FIFO/LIFO/SIPO/RAM/ROM/CAM blocks and register files), AND/NAND/OR/NOR arrays, etc., or combinations thereof.

One particularly useful type of specialized processing block that has been provided on PLDs is a digital signal processing (DSP) block, which may be used to process, e.g., audio signals. Such blocks are frequently also referred to as multiply-accumulate ("MAC") blocks, because they include structures to perform multiplication operations, and sums and/or accumulations of multiplication operations.

For example, PLDs sold by Altera Corporation, of San Jose, Calif., as part of the STRATIX® family, include DSP blocks, each of which may include four 18-by-18 multipliers. Each of those DSP blocks also may include adders and registers, as well as programmable connectors (e.g., multiplexers) that allow the various components to be configured in different ways. In each such block, the multipliers can be configured not only as four individual 18-bit-by-18-bit multipliers, but also as four smaller multipliers, or as one larger (36-bit-by-36-bit) multiplier. In addition, one 18-bit-by-18-bit complex multiplication (which decomposes into two 18-bit-by-18-bit multiplication operations for each of the real and imaginary parts) can be performed.

Multiplication operations may require different levels of precision. Double-precision operations typically involve numbers having twice as many digits in their mantissas as the numbers involved in single-precision operations. Therefore, particularly in the case of floating-point operations, double-precision multiplication operations typically involve large multiplications—e.g., 54-bit-by-54-bit multiplications—as compared to single-precision multiplication operations which typically involve at most 36-bit-by-36-bit multiplications.

Larger multiplications can be performed by using more of the 18-bit-by-18-bit multipliers—e.g., from other DSP blocks. For example, a 54-bit-by-54-bit multiplier can be decomposed, by linear decomposition, into a 36-bit-by-36-bit multiplier (which uses the four 18-bit-by-18-bit multipliers of one DSP block), two 36-bit-by-18-bit multipliers (each of which uses two 18-bit-by-18-bit multipliers, for a total of four additional 18-bit-by-18-bit multipliers, consuming another DSP block), and one 18-bit-by-18-bit multiplier, consuming a portion of a third DSP block. Thus, using 18-bit-by-18-bit multipliers, nine multipliers are required to perform a 54-bit-by-54-bit multiplication.

The number of multipliers needed typically is inflated in mixed-precision operations, because the lower precision operand is typically "promoted"—i.e., converted—to the higher precision before the operation, so that the higher precision of the higher-precision operand can be maintained. Thus, when multiplying a double-precision number by a single-precision number, the single-precision number is converted to a double-precision number and the operation is performed as a double-precision operation—e.g., as a 54-bit-by-54-bit multiplication.

The same holds true—for the same reasons—when carrying out mixed-precision division operations using multiplication-based techniques.

SUMMARY OF THE INVENTION

The present invention reduces the resources needed—particularly in a programmable device—when carrying out mixed-precision multiplication-based operations (i.e., multiplication or division)—particularly floating-point operations—by maintaining the mantissas of the operands in their native precisions. Exponents and other elements can be handled by the higher-precision circuitry as they do not consume significant resources; in the case of a programmable device, these elements can be handled in specialized logic or in programmed general-purpose logic of the device.

Thus, for example, instead of performing multiplication of a double-precision number by a single-precision number as a 54-bit-by-54-bit double-precision multiplication, which requires between eight and ten 18-bit-by-18-bit multipliers, a 54-bit-by-36-bit multiplication can be performed. This can be decomposed into a 36-bit-by-36-bit multiplication and an 18-bit-by-36-bit multiplication, which together require at most six 18-bit-by-18-bit multipliers. This provides a savings of up to 40% or more.

Therefore, in accordance with the present invention, there is provided a method of configuring a programmable integrated circuit device to perform a multiplication-based floating-point operation (i.e., multiplication or division) on a first input value of a first precision represented by a first plurality of bits, and a second input value of a second precision represented by a second plurality of bits. The programmable integrated circuit device incorporates multiplier circuits. The method includes configuring logic of the programmable integrated circuit device to break up the multiplication-based operation into one or more multiplication operations on portions of the first and second input values, configuring logic of the programmable integrated circuit device to break up, for each respective one of those one or more multiplication operations, each respective portion of the first and second input values into a respective plurality of segments, configuring logic of the programmable integrated circuit device for using a quantity of the multiplier circuits to multiply each of the respective plurality of segments; and configuring logic of the programmable integrated circuit device to combine outputs of all of the multiplier circuits.

A programmable logic device so configurable or configured, and a machine-readable data storage medium encoded with software for performing the method, are also provided.

BRIEF DESCRIPTION OF THE DRAWINGS

Further features of the invention, its nature and various advantages, will be apparent upon consideration of the following detailed description, taken in conjunction with the accompanying drawings, in which like reference characters refer to like parts throughout, and in which:

FIG. 1 is a diagram of the logic flow, and a circuit configuration, with which a programmable device may be programmed, for performing multiplication in accordance with an embodiment of the invention;

FIG. 2 is a representation of decomposition of a multiplication in accordance with an embodiment of the invention;

FIG. 3 a schematic representation of an exemplary digital signal processing block configured to perform multiplication in accordance with an embodiment of the invention;

DETAILED DESCRIPTION OF THE INVENTION

Figure 5:
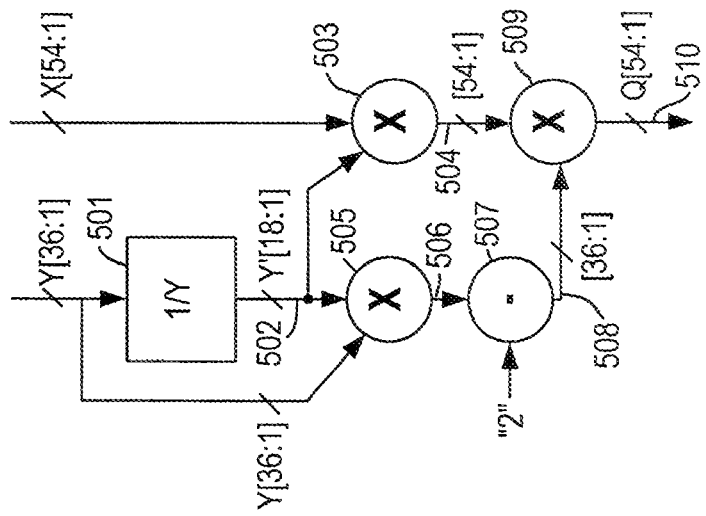
FIG. 5 is a representation of division in accordance with an embodiment of the invention.

In accordance with the present invention, when a double-precision floating point number is to be multiplied by a single-precision floating point number, instead of "promoting" the single-precision number to double precision, and then multiplying two double-precision numbers, which would require a 54-bit-by-54-bit multiplication, each number remains in its native precision. This results in performance of an asymmetric multiplication, such as a 54-bit-by-36-bit multiplication. In the STRATIX® programmable logic device products identified above, this results in the resource savings described above for the mantissa portion of the operation.

The exponent portion of the operation is handled similarly to the aforementioned "promotion" technique, insofar as promotion of the exponents does not consume excessive resources in the way that promotion of the mantissa does. In a programmable device such as a programmable logic device, these exponent operations may be carried out in special purpose logic provided on the device for this purpose, or in programmed general-purpose logic configured for this purpose.

Programmable devices may be configured for floating-point operations of mixed precision in accordance with the present invention using techniques similar to those described in copending, commonly-assigned U.S. patent application Ser. No. 11/625,655, filed Jan. 22, 2007, which is hereby incorporated by reference herein in its entirety.

Mixed-precision floating point operations of the type facilitated by this invention may occur, e.g., in finite impulse response (FIR) filters, where the coefficients may be single precision values while the data are double precision values, or vice-versa. In addition, in large or long-length Fast Fourier Transforms, the data to be processed, and the Discrete Fourier Transforms to be combined, may be single-precision values while the twiddle factors are double-precision values.

The general configuration 10 with which a programmable device may be programmed to carry out a mixed-precision-type floating-point multiplication is shown in FIG. 1. As shown, multiplication 100 has a double-precision floating-point input 101 which may be up to 54 bits wide, a single-precision floating-point input 102 which may be up to 36 bits wide, and a double-precision floating-point output 103.

As can be seen in FIG. 2, 54-bit input 101 can be considered as the concatenation of three 18-bit numbers A[53:36], B[35:18], C[17:0], while 36-bit input 102 can be considered as the concatenation of two 18-bit numbers D[35:18], E[17:0]. Thus, the multiplication operation decomposes into the sum 200 of (A,B)×(D,E), which is a 36-bit-by-36-bit operation 201, and C×(D,E), which is an 18-bit-by-36-bit operation 202. Such operations can be performed in the aforementioned STRATIX® products using two DSP blocks 30, 31, each of which has four 18-bit-by-18-bit multipliers 300-305, using appropriate shifting resources 310, adder resources 311 and block interconnection resources 312.

In certain newer members of the aforementioned STRATIX® family, multiplication is performed more efficiently (when all multipliers 300-307 are being used) by limiting access to individual ones of multipliers 300-307. As a result, if block 31 were in such a device and were used to perform the C×(D,E) multiplication operation, multipliers 304, 305 would be used, and there would be no access to multipliers 306, 307, which would therefore be "wasted" (or unavailable for other portions of a user logic design). Therefore, in accordance with another embodiment of the invention, the C×(D,E) multiplication operation is approximated as C×D, using only multiplier 304, so that multipliers 306, 307 remain accessible to the user for other operations (although multiplier 305 would not be accessible). Although this results in the loss of the eighteen least significant bits of a 72-bit result, only 54 bits are needed in any event. An error resulting from truncating those least significant bits would affect the result only once every few hundred thousand operations ($2^{-18}$=1/262144), and then by only the value of the least significant of the remaining bits. It should be noted that while this truncation of the problem provides access to otherwise unavailable multipliers 306, 307 in certain members of the STRATIX® device family, the efficiencies of this truncation technique also can be used with any device to reduce multiplier usage.

For those cases where individual multipliers 300-307 are available without restriction, the multiplication operation can be performed with six multipliers, whereas a full 54-bit-by-54-bit multiplication requires nine multipliers, or eight multipliers if an occasional least significant bit error can be tolerated. Thus, the invention in such case provides a savings of 25% or 33%.

For those cases where individual multipliers 300-307 are not available without restriction, the multiplication operation can be performed with six multipliers (five plus one "wasted") if an occasional least significant bit error can be tolerated, or eight multipliers otherwise. For a full 54-bit-by-54-bit multiplication, these cases would require eight or ten multipliers respectively. Thus, the invention in such case provides a savings of 25% or 20%.

Adder resources 311 and block interconnection resources 312 may be implemented differently depending on the nature of DSP blocks 30, 31. In some cases, for example, adder resources 311 and block interconnection resources 312 may be configured entirely outside of blocks 30, 31 in programmable logic resources of the programmable device. In other cases, adder resources 311 (which may include one or more compressors in addition to an adder) and block interconnection resources 312, including any necessary multiplexing, may be provided in (or between) blocks 30, 31 themselves.

In the example given above of a 36-bit-by-36-bit operation 201 and an 18-bit-by-36-bit operation 202, operation 201 has a 72-bit output while operation 202 has a 54-bit output, but there is an 18-bit offset between the two outputs. The offset may accommodated by transferring only the 36 most significant bits of the result of operation 202 on interconnection 312. As discussed above, discarding the 18 least significant bits could be expected to have little effect on the result. And in any event, those 18 bits are still available to be output directly from block 31 in the event they are needed.

Figure 4:
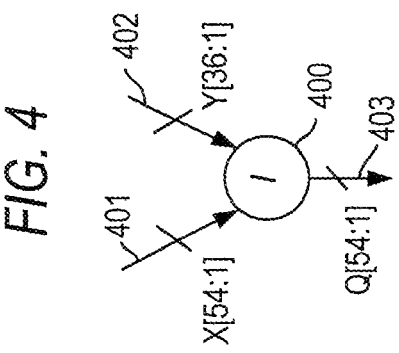
FIG. 4 is a diagram of the logic flow, and a circuit configuration, with which a programmable device may be programmed, for performing division in accordance with an embodiment of the invention.

The invention operates similarly in the case of division. For the division operation Q=X/Y, FIG. 4 shows division 400 with a double-precision floating-point dividend (X) input 401 which may be up to 54 bits wide, a single-precision floating-point divisor (Y) input 402 which may be up to 36 bits wide, and a double-precision floating-point quotient (Q) output 103 which may be up to 54 bits wide.

The datapath for a convergence technique to implement this division operation using multipliers is shown in FIG. 5. First, at 501 an estimate is made of an approximate inverse of the divisor. In this case, the divisor is 36 bits wide, and an inverse Y' of the upper 18 bits is estimated. Although the lower 18 bits are not taken into account, accuracy will not be affected, as the error accumulation will still be below the least significant bits of the output representation. The 18-bit inverse 502 of divisor Y is multiplied at 503 by dividend X to yield an approximation 504 of Q. 18-bit inverse 502 of divisor Y also is multiplied at 505 by divisor Y itself to give a result 506 approximately equal to "1", which is subtracted at 507 from the value "2" to yield a second value 508 approximately equal to "1" by which approximation 504 is multiplied at 509 to provide an approximation 510 of Q which can be used as the result, or iterated to a subsequent stage for further processing.

The three multiplications used are multiplication 503 of size 18×54, or three 18-bit-by-18-bit multipliers, multiplication 505 of size 18×36, or two 18-bit-by-18-bit multipliers, and multiplication 507 of size 54×36, or six 18-bit-by-18-bit multipliers, for a total of 11 18-bit-by-18-bit multipliers. One additional 18-bit-by-18-bit multiplier is needed to perform the Taylor series approximation 501 for the inverse, for a grand total of 12 18-bit-by-18-bit multipliers. This represents about a 60% savings over the 32 18-bit-by-18-bit multipliers normally needed for a 54-bit divider. There also are substantial reductions in logic and in latency.

Logic configured in accordance with the invention may also be used for multiplication of a fixed-point number (with 18 or fewer bits) by a single-precision floating-point number, which could be accommodated as an 18-bit-by-36-bit multiplication after conversion of the fixed-point number to floating-point representation. Because there may be only 18 bits of precision available on the inputs, the mantissas of the input value might not be able to be represented by the 23 bits plus an implied leading 1 as called for, e.g., by the IEEE754-1985 standard for floating-point arithmetic. Rather, after left-shifting by one bit to make the implied leading bit explicit, the six least significant bits of the now-24-bit number can be assumed to be 0s and truncated.

Figure 6:
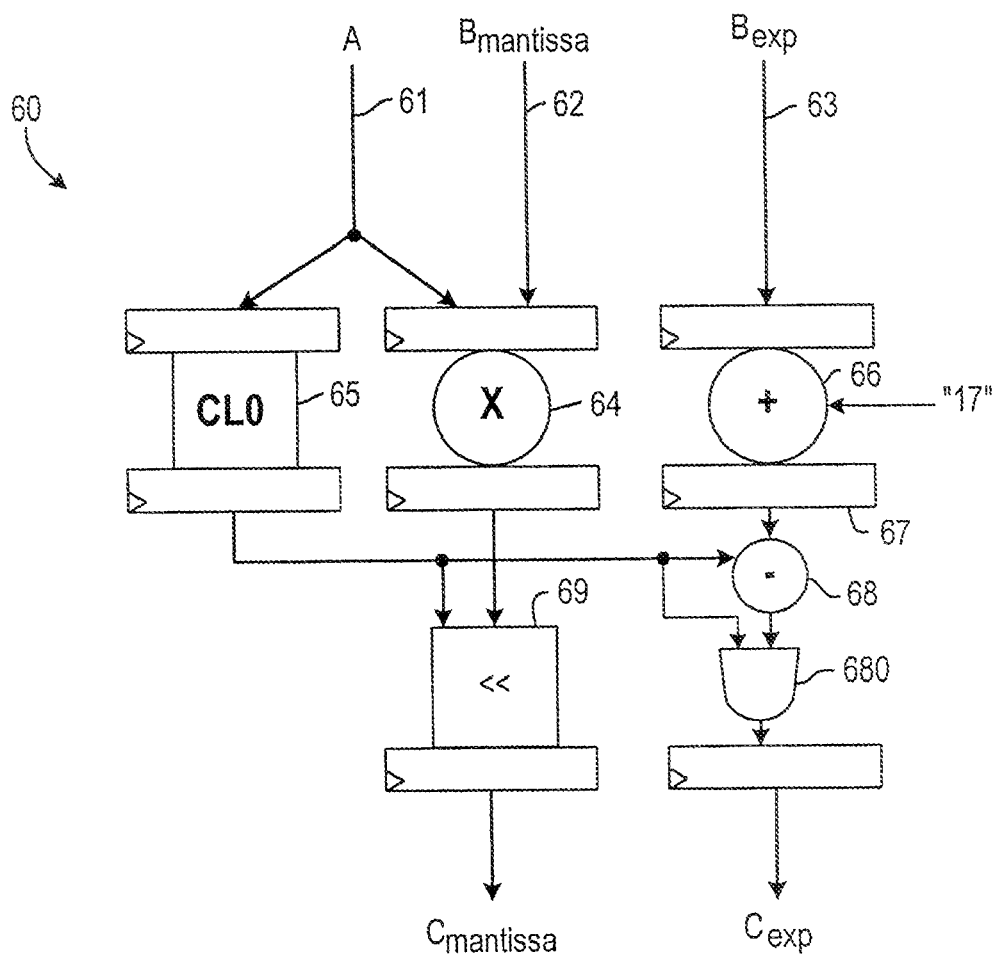
FIG. 6 is a representation of a mixed fixed- and floating-point single-precision operation in accordance with an embodiment of the invention.

In an alternative embodiment 60, a mixed fixed- and floating-point single-precision operation could be carried out without converting the fixed-point number to floating-point representation, as shown in FIG. 6. The inputs are A—an 18-bit fixed-point number 61, and B—a single-precision floating-point number having a mantissa 62 and an exponent 63. Their product is C—single-precision floating-point number.

18-bit fixed-point number A (61) is multiplied directly (i.e., in its native fixed-point format) at 64 with the mantissa 62 of floating-point number B, whose implied leading "1" is set explicitly. Multiplier 64 is 18-bits-by-36-bits, with a 54-bit output. Thus, fixed point number A (62) is effectively converted or "promoted" to a floating-point number without an explicit conversion step.

In parallel with multiplication 64, a count leading zeros circuit 65 determines the magnitude of the input fixed-point number. Specifically, if there are any leading zeros in the fixed-point number, the output of multiplier 64 will be right-shifted by the number of leading zeroes, or by one more depending on the magnitude of the number (i.e., how many ones there are after the first "1").

The exponent is adjusted accordingly. First, 17 is added to exponent 63 by adder 66. Then, exponent 67 so augmented is decreased at subtractor 68 by the number of leading zeroes. Thus, if there are no leading zeroes, then exponent 63 will have been increased by 17. At the other extreme, if there are 17 leading zeroes—i.e., 18-bit fixed-point number A is 17 zeroes followed by a single "1", then the value of A is "1". In this case the exponent increase is 0, or 17-17. In a special case, if the fixed-point number is 0, then the exponent is zeroed using AND-date 680, in accordance with the aforementioned IEEE754-1985 standard.

The output of multiplier 64 is left-shifted at 69 by the number of leading zeros to normalize it. While multiplier 64 has 54 output bits, ordinarily only 36 bits would be used for further processing and the 18 least significant bits would be discarded. Therefore, left-shift 69 will not cause data to be lost, because 36 bits will remain available in the output of multiplier 64.

Thus, the mixed fixed- and floating-point operation is performed without converting either input from one format to the other. The conversion is done instead in parallel with the multiplication, and used to adjust the multiplier output.

This type of mixed fixed- and floating-point single-precision operation also could be used for division in accordance with the invention. The operation would be similar to that described above for double-precision values in connection with FIG. 5, except that the 18-bit inverse estimate could be calculated directly from the divisor.

Although multiplication operations in accordance with the invention have been described thus far in terms of 54 bits for double precision and 36 bits for single precision, the present invention provides savings when multiplying or dividing numbers of different precision regardless of the number of bits by which each level of precision is represented. Moreover, while each multiplication has been described as being broken down into a number of 18-bit-by-18-bit multiplications, the present invention can be implemented by breaking down any large multiplication into smaller segments. Thus, a 48-bit-by-48-bit multiplication can be broken down into a number of 16-bit-by-16-bit multiplications by breaking the inputs into three 16-bit segments. The number of multipliers needed will be equal to the number of terms—e.g., two numbers each broken into three segments will require six multipliers—instead of the square of the number of terms, as long each segments is smaller than the size of multiplier—e.g. 18-bits-by-18-bits. Even if the segments are larger than the available multipliers, but by only a small number of bits, it may be possible to extend the multipliers as described in copending, commonly-assigned U.S. patent application Ser.

No. 12/244,565, filed Oct. 2, 2008, which is hereby incorporated by reference herein in its entirety.

With the exception of the embodiment shown in FIG. 6, the embodiments described above have shown hard logic—i.e., dedicated multipliers—only for calculation of the mantissa of the product in question. With regard to the exponent, logic as shown in FIG. 6 either can be provided as dedicated circuitry (including adders and subtractors), or can be configured from general-purpose programmable logic of the programmable integrated circuit device.

Thus, the method of the invention configures a programmable integrated circuit device, such as a PLD, to create the structures shown in FIGS. 1-5 to perform asymmetric multiplications, allowing multiplication of numbers of different precision without promoting the lower-precision number to the higher precision.

Instructions for carrying out the method according to this invention may be encoded on a machine-readable medium, to be executed by a suitable computer or similar device to implement the method of the invention for programming or configuring programmable integrated circuit devices to perform operations as described above. For example, a personal computer may be equipped with an interface to which a programmable integrated circuit device can be connected, and the personal computer can be used by a user to program the programmable integrated circuit device using a suitable software tool, such as the QUARTUS® II software available from Altera Corporation, of San Jose, Calif.

Figure 7:
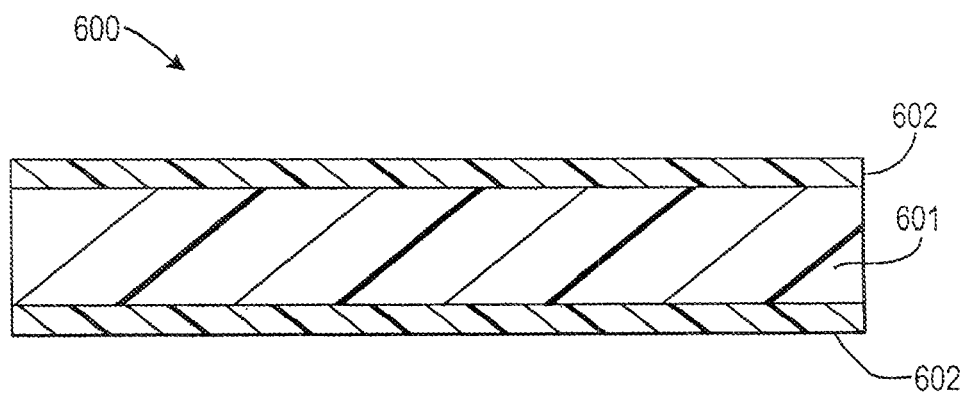
FIG. 7 is a cross-sectional view of a magnetic data storage medium encoded with a set of machine-executable instructions for performing the method according to the present invention.

FIG. 7 presents a cross section of a magnetic data storage medium 600 which can be encoded with a machine executable program that can be carried out by systems such as the aforementioned personal computer, or other computer or similar device. Medium 600 can be a floppy diskette or hard disk, or magnetic tape, having a suitable substrate 601, which may be conventional, and a suitable coating 602, which may be conventional, on one or both sides, containing magnetic domains (not visible) whose polarity or orientation can be altered magnetically. Except in the case where it is magnetic tape, medium 600 may also have an opening (not shown) for receiving the spindle of a disk drive or other data storage device.

The magnetic domains of coating 602 of medium 600 are polarized or oriented so as to encode, in manner which may be conventional, a machine-executable program, for execution by a programming system such as a personal computer or other computer or similar system, having a socket or peripheral attachment into which the PLD to be programmed may be inserted, to configure appropriate portions of the PLD, including its specialized processing blocks, if any, in accordance with the invention.

Figure 8:
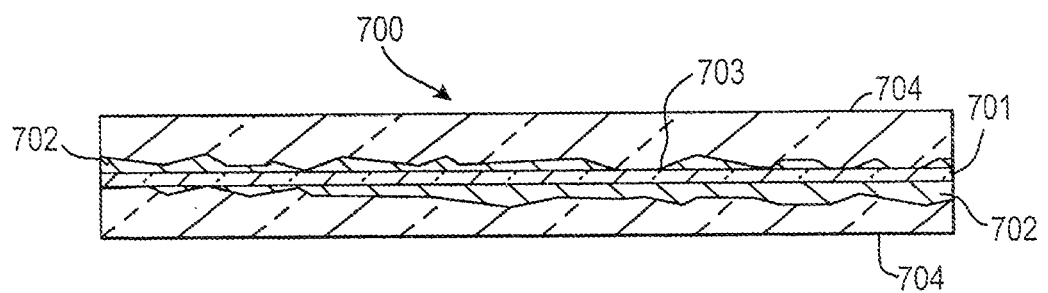
FIG. 8 is a cross-sectional view of an optically readable data storage medium encoded with a set of machine executable instructions for performing the method according to the present invention.

FIG. 8 shows a cross section of an optically-readable data storage medium 700 which also can be encoded with such a machine-executable program, which can be carried out by systems such as the aforementioned personal computer, or other computer or similar device. Medium 700 can be a conventional compact disk read only memory (CD-ROM) or digital video disk read only memory (DVD-ROM) or a rewriteable medium such as a CD-R, CD-RW, DVD-R, DVD-RW, DVD+R, DVD+RW, or DVD-RAM or a magneto-optical disk which is optically readable and magneto-optically rewriteable. Medium 700 preferably has a suitable substrate 701, which may be conventional, and a suitable coating 702, which may be conventional, usually on one or both sides of substrate 701.

In the case of a CD-based or DVD-based medium, as is well known, coating 702 is reflective and is impressed with a plurality of pits 703, arranged on one or more layers, to encode the machine-executable program. The arrangement of pits is read by reflecting laser light off the surface of coating 702. A protective coating 704, which preferably is substantially transparent, is provided on top of coating 702.

In the case of magneto-optical disk, as is well known, coating 702 has no pits 703, but has a plurality of magnetic domains whose polarity or orientation can be changed magnetically when heated above a certain temperature, as by a laser (not shown). The orientation of the domains can be read by measuring the polarization of laser light reflected from coating 702. The arrangement of the domains encodes the program as described above.

Thus it is seen that a method for efficiently carrying out multiplications of numbers of different precisions in a programmable integrated circuit device, a programmable integrated circuit device programmed to perform the method, and software for carrying out the programming, have been provided.

Figure 9:
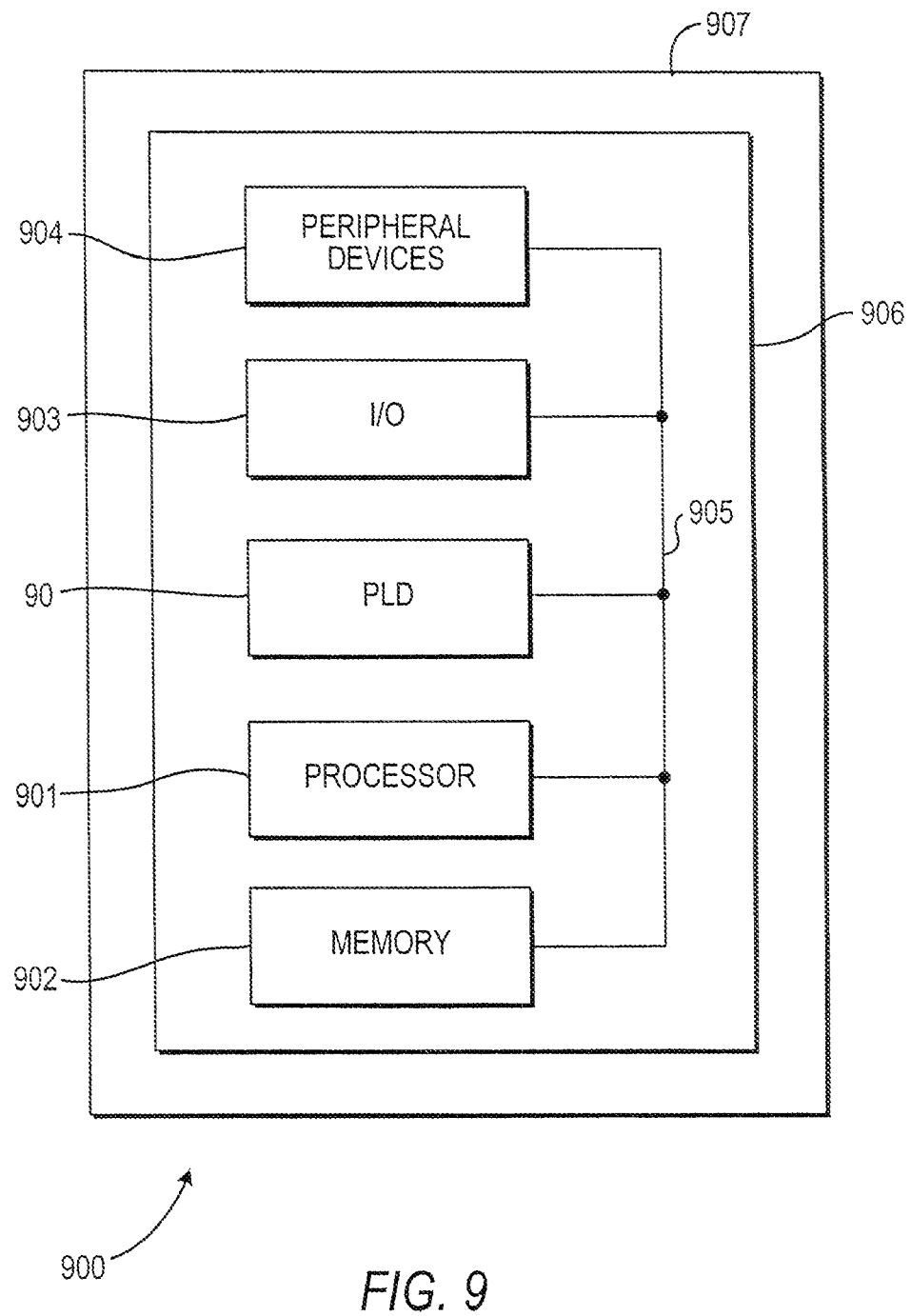
FIG. 9 is a simplified block diagram of an illustrative system employing a programmable logic device incorporating the present invention.

A PLD 90 programmed according to the present invention may be used in many kinds of electronic devices. One possible use is in a data processing system 900 shown in FIG. 9. Data processing system 900 may include one or more of the following components: a processor 901; memory 902; I/O circuitry 903; and peripheral devices 904. These components are coupled together by a system bus 905 and are populated on a circuit board 906 which is contained in an end-user system 907.

System 900 can be used in a wide variety of applications, such as computer networking, data networking, instrumentation, video processing, digital signal processing, or any other application where the advantage of using programmable or reprogrammable logic is desirable. PLD 90 can be used to perform a variety of different logic functions. For example, PLD 90 can be configured as a processor or controller that works in cooperation with processor 901. PLD 90 may also be used as an arbiter for arbitrating access to a shared resources in system 900. In yet another example, PLD 90 can be configured as an interface between processor 901 and one of the other components in system 900. It should be noted that system 900 is only exemplary, and that the true scope and spirit of the invention should be indicated by the following claims.

Various technologies can be used to implement PLDs 90 as described above and incorporating this invention.

It will be understood that the foregoing is only illustrative of the principles of the invention, and that various modifications can be made by those skilled in the art without departing from the scope and spirit of the invention. For example, the various elements of this invention can be provided on a programmable integrated circuit device in any desired number and/or arrangement. One skilled in the art will appreciate that the present invention can be practiced by other than the described embodiments, which are presented for purposes of illustration and not of limitation, and the present invention is limited only by the claims that follow.

The resources needed—particularly in a programmable device—when carrying out a mixed-precision multiplication-based floating-point operation (i.e., multiplication or division) are reduced by maintaining the mantissas of the operands in their native precisions instead of promoting the lower-precision number to the higher precision. Exponents and other elements can be handled by the higher-precision logic as they do not consume significant resources.

What is claimed is:

1. A method of configuring a programmable integrated circuit device to perform a multiplication-based floating-point operation on a first input value of a first precision defined by an industry standard and represented by a first number of bits, and a second input value of a second precision, defined by said industry standard, different in precision from said first precision defined by said industry standard, and represented by a second number of bits different in count from said first number, wherein said programmable integrated circuit device incorporates multiplier circuits, said method comprising:

configuring logic of said programmable integrated circuit device to break up said multiplication-based floating-point operation into one or more multiplication operations on different portions of said first and second input values of said first and second precisions defined by said industry standard;

configuring logic of said programmable integrated circuit device to break up, for each one of said one or more multiplication operations, each different portion of said first input value of said first precision defined by said industry standard into a first plurality of input segments of a certain size and each different portion of said second input value of said second precision defined by said industry standard into a second plurality of input segments of the certain size;

configuring logic of said programmable integrated circuit device for using a quantity of said multiplier circuits to multiply said first plurality of input segments by said second plurality of input segments; and configuring logic of said programmable integrated circuit device to combine outputs of all said multiplier circuits.

2. The method of claim 1 wherein said multiplication-based operation is multiplication.

3. The method of claim 1 wherein said multiplication-based operation is division.

4. The method of claim 1 further comprising configuring logic of said programmable integrated circuit device to discard a least significant one of said input segments.

5. The method of claim 1 wherein:

one of said first and second input values is a floating-point number and another of said first and second input values is a fixed-point number; said method further comprising:

converting said another of said first and second input values into a floating-point number.

6. The method of claim 1 wherein:

said first input value has a first mantissa and a first exponent, and said second input value has a second mantissa and a second exponent; and said multiplier circuits operate on said first and second mantissas to provide a mantissa of a product of said input values; said method further comprising:

configuring general-purpose programmable logic of said programmable integrated circuit device to operate on said first and second exponents to provide an exponent of said product of said input values.

7. A programmable integrated circuit device configured to perform a multiplication-based floating-point operation on a first input value of a first precision defined by an industry standard and represented by a first number of bits, and a second input value of a second precision defined by said industry standard, different in precision from said first precision defined by said industry standard, and represented by a second number of bits different in count from said first number, wherein said programmable integrated circuit device incorporates multiplier circuits, said configured programmable integrated circuit device comprising:

logic configured to break up said multiplication-based floating-point operation into one or more multiplication operations on different portions of said first and second input values of said first and second precisions defined by said industry standard;

logic configured to break up, for each one of said one or more multiplication operations, each different portion of said first precision defined by said industry standard into a first plurality of input segments of a certain size and each different portion of said second input value of said second precision defined by said industry standard into a second plurality of input segments of the certain size;

logic configured to use a quantity of said multiplier circuits to multiply said first plurality of input segments by said second plurality of input segments; and logic configured to combine outputs of all said multiplier circuits.

8. The programmable integrated circuit device of claim 7 wherein said multiplication-based operation is multiplication.

9. The programmable integrated circuit device of claim 7 wherein said multiplication-based operation is division.

10. The programmable integrated circuit device of claim 7 further comprising logic configured to discard a least significant one of said input segments.

11. The programmable integrated circuit device of claim 7 wherein:

one of said first and second input values is a floating-point number and another of said first and second input values is a fixed-point number; said programmable integrated circuit device further comprising:

logic configured to convert said another of said first and second input values into a floating-point number.

12. The programmable integrated circuit device of claim 7 wherein:

said first input value has a first mantissa and a first exponent, and said second input value has a second mantissa and a second exponent; and said multiplier circuits operate on said first and second mantissas to provide a mantissa of a product of said input values; said programmable integrated circuit device further comprising:

general-purpose programmable logic of said programmable integrated circuit device configured to operate on said first and second exponents to provide an exponent of said product of said input values.

13. A non-transitory machine-readable data storage medium encoded with machine-executable instructions for configuring a programmable integrated circuit device to perform a multiplication-based floating-point operation on a first input value of a first precision defined by an industry standard and represented by a first number of bits, and a second input value of a second precision defined by said industry standard, different in precision from said first precision defined by said industry standard, and represented by a second number of bits different in count from said first number, wherein said programmable integrated circuit device incorporates multiplier circuits, said instructions comprising:

instructions to configure logic of said programmable integrated circuit device to break up said multiplication-based floating-point operation into one or more multiplication operations on different portions of said first and second input values of said first and second precisions defined by said industry standard;

instructions to configure logic of said programmable integrated circuit device to break up, for each one of said one or more multiplication operations, each different portion of said first input value of said first precision defined by said industry standard into a first plurality of input segments of a certain size and each different portion of said second input value of said second precision defined by said industry standard into a second plurality of input segments of the certain size;

instructions to configure logic of said programmable integrated circuit device for using a quantity of said multiplier circuits to multiply said first plurality of input segments by said second plurality of input segments; and instructions to configure logic of said programmable integrated circuit device to combine outputs of all said multiplier circuits.

14. The non-transitory machine-readable data storage medium of claim 13 wherein said multiplication-based operation configured by said instructions is multiplication.

15. The non-transitory machine-readable data storage medium of claim 13 wherein said multiplication-based operation configured by said instructions is division.

16. The non-transitory machine-readable data storage medium of claim 13 wherein said instructions further comprise instructions to configure logic of said programmable integrated circuit device to discard a least significant one of said input segments.

17. The non-transitory machine-readable data storage medium of claim 13 wherein:

one of said first and second input values is a floating-point number and another of said first and second input values is a fixed-point number; said instructions further comprising:

instructions to configure logic of said programmable integrated circuit device to convert said another of said first and second input values into a floating-point number.

18. The non-transitory machine-readable data storage medium of claim 13 wherein:

said first input value has a first mantissa and a first exponent, and said second input value has a second mantissa and a second exponent; and said instructions configure said multiplier circuits operate on said first and second mantissas to provide a mantissa of a product of said input values; said instructions further comprising:

instructions to configure general-purpose programmable logic of said programmable integrated circuit device to operate on said first and second exponents to provide an exponent of said product of said input values.

\* \* \* \* \*